(12) United States Patent
Upshur et al.

(10) Patent No.: US 10,771,306 B2
(45) Date of Patent: *Sep. 8, 2020

(54) LOG MONITORING SYSTEM

(71) Applicant: Amazon Technologies, Inc., Seattle, WA (US)

(72) Inventors: Raleigh H. Upshur, Seattle, WA (US); Nicholas Alexander Allen, Seattle, WA (US); Patrick J. Ward, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

This patent is subject to a terminal disclaimer.

(21) Appl. No.: 15/788,381

(22) Filed: Oct. 19, 2017

(65) Prior Publication Data
US 2018/0062909 A1 Mar. 1, 2018

Related U.S. Application Data

(63) Continuation of application No. 13/369,086, filed on Feb. 8, 2012, now Pat. No. 9,800,455.

(51) Int. Cl.
*H04L 29/08* (2006.01)
*G06F 11/00* (2006.01)
*H04L 12/24* (2006.01)

(52) U.S. Cl.
CPC ........ *H04L 29/08072* (2013.01); *G06F 11/00* (2013.01); *H04L 41/069* (2013.01); *H04L 41/0686* (2013.01)

(58) Field of Classification Search
CPC .......... H04L 63/1425; H04L 29/08072; H04L 41/0686; H04L 41/069; H04L 43/00; H04L 63/0428; H04L 43/06; G06F 11/00; G06F 11/3476; G06F 11/0787; G06F 21/552; G06F 21/64; G06F 2221/2101; G06F 16/958; G06F 2221/2119; G06F 11/3409; G06F 11/0778; G06F 11/3452;
(Continued)

(56) References Cited

U.S. PATENT DOCUMENTS 5,829,005 A * 10/1998 Senator .................. G06F 16/10
5,848,415 A    12/1998 Guck
5,915,001 A     6/1999 Uppaluru
(Continued)

OTHER PUBLICATIONS

Al-Hammadi, Yousof; Behavioural correlation for malicious bot detection; Oct. 20, 2010; University of Nottingham; pp. 1-271. (Year: 2010).*
(Continued)

*Primary Examiner* — Hua Fan
*Assistant Examiner* — Muhammad Raza
(74) *Attorney, Agent, or Firm* — Thomas Horstemeyer, LLP

(57) ABSTRACT

Disclosed are various embodiments for a log monitoring system to monitor the health of server log files. The log monitoring system may generate at least one log health signal based on an analysis of the server log content generated by at least one host application. Furthermore, the application may generate a system integrity record based on the at least one log health signal and an external signal, wherein the external signal embodies a system health metric of the at least one host application.

20 Claims, 4 Drawing Sheets

(58) Field of Classification Search
CPC ............ G06F 11/0784; G06F 11/3006; G06K 9/00899; G06K 9/00; G06T 7/97
See application file for complete search history.

(56) References Cited

U.S. PATENT DOCUMENTS

| | | |
|---|---|---|
| 6,356,863 B1 | 3/2002 | Sayle |
| 6,470,345 B1 | 10/2002 | Doutre et al. |
| 6,757,708 B1 | 6/2004 | Craig et al. |
| 6,904,598 B2 | 6/2005 | Abileah et al. |
| 6,944,658 B1 | 9/2005 | Schneider |
| 6,990,653 B1 | 1/2006 | Burd et al. |
| 7,000,238 B2 | 2/2006 | Nadler et al. |
| 7,113,301 B2 | 9/2006 | Su |
| 7,152,242 B2 | 12/2006 | Douglas |
| 7,181,768 B1 | 2/2007 | Ghosh et al. |
| 7,237,200 B2 | 6/2007 | Wisniewski |
| 7,254,634 B1 | 8/2007 | Davis et al. |
| 7,267,275 B2 | 9/2007 | Cox et al. |
| 7,287,035 B2 | 10/2007 | Madan et al. |
| 7,340,714 B2 | 3/2008 | Upton |
| 7,392,255 B1 | 6/2008 | Sholtis et al. |
| 7,415,722 B2 | 8/2008 | Tateoka |
| 7,454,508 B2 | 11/2008 | Mathew et al. |
| 7,490,331 B2 | 2/2009 | Beisiegel et al. |
| 7,499,909 B2 | 3/2009 | Liu et al. |
| 7,509,468 B1 | 3/2009 | Dalal et al. |
| 7,512,979 B1 | 3/2009 | Koike et al. |
| 7,587,712 B2 | 9/2009 | Mountain et al. |
| 7,620,653 B1 | 11/2009 | Swartz |
| 7,698,398 B1 | 4/2010 | Lai |
| 7,720,939 B1 | 5/2010 | Leroy |
| 7,725,465 B2 | 5/2010 | Liao et al. |
| 7,747,610 B2 | 6/2010 | Chinchwadkar et al. |
| 7,774,754 B2 | 8/2010 | Komissarchik et al. |
| 7,818,399 B1 | 10/2010 | Ross et al. |
| 7,941,419 B2 | 5/2011 | Bhatkar et al. |
| 8,005,816 B2 | 8/2011 | Krishnaprasad et al. |
| 8,027,982 B2 | 9/2011 | Ture et al. |
| 8,090,816 B1 | 1/2012 | Deshmukh et al. |
| 8,171,547 B2 | 5/2012 | Thorley et al. |
| 8,250,215 B2 | 8/2012 | Stienhans et al. |
| 8,281,026 B2 | 10/2012 | Lankford et al. |
| 8,290,977 B2 | 10/2012 | Chinchwadkar et al. |
| 8,321,910 B1 | 11/2012 | English et al. |
| 8,332,430 B2 | 12/2012 | Koide et al. |
| 8,332,825 B2 | 12/2012 | Mital et al. |
| 8,352,475 B2 | 1/2013 | Bhatkar et al. |
| 8,364,811 B1 | 1/2013 | Erdmann et al. |
| 8,413,244 B1 | 4/2013 | Nachenberg |
| 8,438,648 B2 | 5/2013 | Bacus et al. |
| 8,468,360 B2 | 6/2013 | Morita et al. |
| 8,504,911 B1 | 8/2013 | Thakare et al. |
| 8,527,943 B1 | 9/2013 | Chiluvuri |
| 8,706,803 B1 | 4/2014 | Whitcomb |
| 8,732,418 B1 | 5/2014 | Abdulla |
| 8,775,559 B1 | 7/2014 | Huntwork et al. |
| 8,819,477 B1 | 8/2014 | Thakare et al. |
| 8,832,225 B1 | 9/2014 | Thakare et al. |
| 8,862,984 B1 | 10/2014 | Thakare et al. |
| 8,874,688 B1 | 10/2014 | Huntwork et al. |
| 8,959,426 B1 | 2/2015 | Thakare et al. |
| 9,183,189 B1 | 11/2015 | Thakare et al. |
| 9,270,727 B1 | 2/2016 | Thakare et al. |
| 9,396,053 B2 | 7/2016 | Thakare et al. |
| 2002/0046240 A1 | 4/2002 | Graham et al. |
| 2002/0056012 A1 | 5/2002 | Abileah et al. |
| 2002/0078158 A1 | 6/2002 | Brown et al. |
| 2002/0078168 A1 | 6/2002 | Christfort et al. |
| 2002/0099818 A1 | 7/2002 | Russell et al. |
| 2002/0152429 A1* | 10/2002 | Bergsten ............ G06F 11/1471 714/43 |
| 2002/0165936 A1 | 11/2002 | Alston et al. |
| 2002/0178214 A1 | 11/2002 | Brittenham et al. |
| 2003/0033369 A1 | 2/2003 | Bernhard |
| 2003/0061132 A1 | 3/2003 | Yu et al. |
| 2003/0101265 A1 | 5/2003 | Dantzig et al. |
| 2003/0120593 A1 | 6/2003 | Bansal et al. |
| 2003/0140100 A1 | 7/2003 | Pullara |
| 2003/0154239 A1 | 8/2003 | Davis et al. |
| 2003/0188021 A1 | 10/2003 | Challenger et al. |
| 2003/0236992 A1* | 12/2003 | Yami ............... G06F 21/552 726/23 |
| 2004/0010598 A1 | 1/2004 | Bales et al. |
| 2004/0181609 A1 | 9/2004 | Ullmann et al. |
| 2004/0205555 A1 | 10/2004 | Hind et al. |
| 2004/0266533 A1 | 12/2004 | Gentles et al. |
| 2005/0037733 A1 | 2/2005 | Coleman et al. |
| 2005/0038871 A1 | 2/2005 | Dean |
| 2005/0044197 A1 | 2/2005 | Lai |
| 2005/0114508 A1 | 5/2005 | DeStefano |
| 2005/0187930 A1 | 8/2005 | Subramanian et al. |
| 2006/0069774 A1 | 3/2006 | Chen et al. |
| 2006/0129627 A1 | 6/2006 | Phillips et al. |
| 2006/0168225 A1 | 7/2006 | Gunning et al. |
| 2006/0259719 A1 | 11/2006 | Hirano et al. |
| 2007/0186284 A1 | 8/2007 | McConnell |
| 2007/0192215 A1 | 8/2007 | Taylor et al. |
| 2007/0208744 A1 | 9/2007 | Krishnaprasad et al. |
| 2007/0208755 A1 | 9/2007 | Bhatkar et al. |
| 2007/0209080 A1 | 9/2007 | Ture et al. |
| 2007/0250928 A1 | 10/2007 | Boney |
| 2007/0266373 A1 | 11/2007 | Liu |
| 2007/0299965 A1 | 12/2007 | Nieh et al. |
| 2007/0300220 A1 | 12/2007 | Seliger et al. |
| 2008/0043717 A1 | 2/2008 | Bellora et al. |
| 2008/0047016 A1 | 2/2008 | Spoonamore |
| 2008/0059310 A1 | 3/2008 | Lettow et al. |
| 2008/0077851 A1 | 3/2008 | Hesmer et al. |
| 2008/0098023 A1 | 4/2008 | Araki et al. |
| 2008/0141332 A1 | 6/2008 | Treinen |
| 2009/0037514 A1 | 2/2009 | Lankford et al. |
| 2009/0083294 A1 | 3/2009 | Gao et al. |
| 2009/0106280 A1 | 4/2009 | Natchetoi et al. |
| 2009/0106838 A1 | 4/2009 | Clark et al. |
| 2009/0126002 A1 | 5/2009 | Vail et al. |
| 2009/0157744 A1 | 6/2009 | McConnell |
| 2009/0172816 A1 | 7/2009 | Maino et al. |
| 2009/0260079 A1* | 10/2009 | Anbo ............... G06F 21/64 726/22 |
| 2010/0030544 A1 | 2/2010 | Gopalan et al. |
| 2010/0031156 A1 | 2/2010 | Doyle et al. |
| 2010/0058293 A1 | 3/2010 | Dunagan et al. |
| 2010/0082513 A1 | 4/2010 | Liu |
| 2010/0114714 A1 | 5/2010 | Vitek |
| 2010/0121975 A1 | 5/2010 | Sinha et al. |
| 2010/0131650 A1 | 5/2010 | Pok et al. |
| 2010/0185590 A1 | 7/2010 | DAngelo et al. |
| 2010/0217891 A1 | 8/2010 | Strack et al. |
| 2010/0235831 A1 | 9/2010 | Dittmer |
| 2010/0268818 A1 | 10/2010 | Richmond et al. |
| 2010/0325263 A1 | 12/2010 | Raja et al. |
| 2011/0010633 A1 | 1/2011 | Richmond et al. |
| 2011/0029818 A1 | 2/2011 | Saito |
| 2011/0035273 A1 | 2/2011 | Parikh et al. |
| 2011/0055900 A1 | 3/2011 | Chua et al. |
| 2011/0087560 A1 | 4/2011 | West |
| 2011/0088039 A1 | 4/2011 | Tabone |
| 2011/0106608 A1 | 5/2011 | Rothberg |
| 2011/0125716 A1 | 5/2011 | Drews et al. |
| 2011/0197279 A1 | 8/2011 | Ueoka |
| 2011/0246294 A1 | 10/2011 | Robb et al. |
| 2011/0277027 A1 | 11/2011 | Hayton et al. |
| 2011/0302243 A1 | 12/2011 | Ashcraft et al. |
| 2011/0321162 A1 | 12/2011 | Gluck |
| 2012/0042125 A1 | 2/2012 | Kumar et al. |
| 2012/0066586 A1 | 3/2012 | Shemesh |
| 2012/0072710 A1 | 3/2012 | Gupta et al. |
| 2012/0102098 A1 | 4/2012 | Guillou et al. |
| 2012/0131045 A1 | 5/2012 | Ullmann et al. |
| 2012/0136926 A1 | 5/2012 | Dillon |
| 2012/0136927 A1 | 5/2012 | Dillon et al. |
| 2012/0136928 A1 | 5/2012 | Dillon |
| 2012/0137210 A1 | 5/2012 | Dillon |

(56) References Cited

U.S. PATENT DOCUMENTS

| | | |
|---|---|---|
| 2012/0150993 A1 | 6/2012 | Flack et al. |
| 2012/0265959 A1 | 10/2012 | Le et al. |
| 2012/0278430 A1 | 11/2012 | Lehane et al. |
| 2012/0302162 A1 | 11/2012 | Chueh et al. |
| 2012/0304275 A1 | 11/2012 | Ji et al. |
| 2013/0055252 A1 | 2/2013 | Lagar-Cavilla et al. |
| 2013/0080617 A1 | 3/2013 | Driesen et al. |
| 2013/0276117 A1 | 10/2013 | Hwang |
| 2014/0208047 A1 | 7/2014 | Vembu et al. |
| 2014/0380148 A1 | 12/2014 | Thakare et al. |
| 2015/0047031 A1 | 2/2015 | Huntwork et al. |

OTHER PUBLICATIONS

Al-Hammadi, Yousof Ali Abdulla, Behavioural Correlation for Malicious Bot Detection, Oct. 20, 2010, University of Nottingham.
U.S. Appl. No. 15/390,845, filed Dec. 27, 2016, Response to Final Office Action dated Mar. 28, 2018.
U.S. Appl. No. 15/390,845, filed Dec. 27, 2016, Advisory Action dated Jun. 15, 2018.
U.S. Appl. No. 13/369,086, filed Feb. 8, 2012, Non-Final Office Action dated Nov. 20, 2014.
U.S. Appl. No. 13/369,086, filed Feb. 8, 2012, Response to Non-Final Office Action dated Nov. 20, 2014.
U.S. Appl. No. 13/369,086, filed Feb. 8, 2012, Final Office Action dated Jul. 31, 2015.
U.S. Appl. No. 13/369,086, filed Feb. 8, 2012, Response to Final Office Action dated Jul. 31, 2015.
U.S. Appl. No. 13/369,086, filed Feb. 8, 2012, Non-Final Office Action dated Jul. 18, 2016.
U.S. Appl. No. 13/369,086, filed Feb. 8, 2012, Response to Non-Final Office Action dated Jul. 18, 2016.
U.S. Appl. No. 13/369,086, filed Feb. 8, 2012, Final Office Action dated Jan. 18, 2017.
U.S. Appl. No. 13/369,086, filed Feb. 8, 2012, Notice of Allowance dated Jun. 16, 2017.
U.S. Appl. No. 13/363,761, filed Feb. 1, 2012, Non-Final Office Action dated Jul. 8, 2013.
U.S. Appl. No. 13/363,761, filed Feb. 1, 2012, Response to Non-Final Office Action dated Jul. 8, 2013.
U.S. Appl. No. 13/363,761, filed Feb. 1, 2012, Final Office Action dated Jan. 2, 2014.
U.S. Appl. No. 13/363,761, filed Feb. 1, 2012, Response to Final Office Action dated Jan. 2, 2014.
U.S. Appl. No. 13/363,761, filed Feb. 1, 2012, Notice of Allowance dated Apr. 25, 2014.
U.S. Appl. No. 14/479,786, filed Sep. 8, 2014, Non-Final Office Action dated Jul. 5, 2016.
U.S. Appl. No. 14/479,786, filed Sep. 8, 2014, Response to Non-Final Office Action dated Jul. 5, 2016.
U.S. Appl. No. 14/479,786, filed Sep. 8, 2014, Final Office Action dated Dec. 30, 2016.
U.S. Appl. No. 14/479,786, filed Sep. 8, 2014, Notice of Allowance dated Jun. 21, 2017.
U.S. Appl. No. 13/363,770, filed Feb. 1, 2012, Non-Final Office Action dated Aug. 27, 2013.
U.S. Appl. No. 13/363,770, filed Feb. 1, 2012, Response to Non-Final Office Action dated Aug. 27, 2013.
U.S. Appl. No. 13/363,770, filed Feb. 1, 2012, Final Office Action dated Dec. 30, 2013.
U.S. Appl. No. 13/363,770, filed Feb. 1, 2012, Response to Final Office Action dated Dec. 30, 2013.
U.S. Appl. No. 13/363,770, filed Feb. 1, 2012, Advisory Action dated Apr. 7, 2014.
U.S. Appl. No. 13/363,770, filed Feb. 1, 2012, Non-Final Office Action dated Jun. 24, 2014.
U.S. Appl. No. 13/363,770, filed Feb. 1, 2012, Response to Non-Final Office Action dated Jun. 24, 2014.
U.S. Appl. No. 13/363,770, filed Feb. 1, 2012, Notice of Allowance dated Oct. 7, 2014.
U.S. Appl. No. 13/363,782, filed Feb. 1, 2012, Non-Final Office Action dated Dec. 19, 2013.
U.S. Appl. No. 13/363,782, filed Feb. 1, 2012, Notice of Allowance dated Apr. 21, 2014.
U.S. Appl. No. 13/363,782, filed Feb. 1, 2012, Response to Non-Final Office Action dated Dec. 19, 2013.
Mueller, et al.: Removing Performance Bottlenecks Through JSP Precompilation; Jun. 20, 2012; Weblogic; pp. 1-7.
Jasper 2 JSP Engine How to; Nov. 3, 2005; The Apache Jakarta Project; pp. 1-4.
"Introduction to ClienUServer Fundamentals;" ClienUServer Fundamentals; Feb. 8, 1999; Network Computing; pp. 1-9.
Ryan et al.; "Request for Comments: 2713, Schema for Representing Java(tm) Objects in an LDAP Directory;" Oct. 1999; The Internet Society; pp. 1-21.
Kochmer et al.; JSP and XML Integrating XML and Web Services in Your JSP Application; Mar. 19, 2002; Addison-Wesley Professional; pp. 214-228 and 287-308.
WSDL Types Element; Feb. 8, 2007; Tutorial Point; pp. 1-2.
JSP Globalization Support; 2002; Oracle.com; pp. 1-6.
RightNow Connect Web Services for SOAP; 201 0; RightNow Technologies, Inc., pp. 1-2.
Building a Report with Aggregate Data; 2002; Oracle. corn, pp. 1-9.
Saxon: the Java API; Sep. 10, 2003; Sourceforge.net; pp. 1-5.
U.S. Appl. No. 14/463,284, filed Aug. 19, 2014, Non-Final Office Action dated Dec. 7, 2015.
U.S. Appl. No. 14/463,284, filed Aug. 19, 2014, Response to Non-Final Office Action dated Dec. 7, 2015.
U.S. Appl. No. 14/463,284, filed Aug. 19, 2014, Notice of Allowance dated Mar. 28, 2016.
U.S. Appl. No. 13/363,787, filed Feb. 1, 2012, Non-Final Office Action dated Sep. 20, 2013.
U.S. Appl. No. 13/363,787, filed Feb. 1, 2012, Advisory Action dated Apr. 25, 2014.
U.S. Appl. No. 13/363,787, filed Feb. 1, 2012, Final Office Action dated Feb. 20, 2014.
U.S. Appl. No. 13/363,787, filed Feb. 1, 2012, Notice of Allowance dated Jun. 3, 2014.
U.S. Appl. No. 13/363,787, filed Feb. 1, 2012, Response to Final Office Action dated Feb. 20, 2014.
U.S. Appl. No. 13/363,787, filed Feb. 1, 2012, Response to Non-Final Office Action dated Sep. 20, 2013.
U.S. Appl. No. 15/390,845, filed Dec. 27, 2016, Final Office Action dated Mar. 28, 2018.
U.S. Appl. No. 13/347,953, filed Jan. 11, 2012, Restriction/Election dated Sep. 16, 2014.
U.S. Appl. No. 13/347,953, filed Jan. 11, 2012, Response to Restriction/Election dated Sep. 16, 2014.
U.S. Appl. No. 13/347,953, filed Jan. 11, 2012, Non-Final Office Action dated Jan. 7, 2015.
U.S. Appl. No. 13/347,953, filed Jan. 11, 2012, Response to Non-Final Office Action dated Jan. 7, 2015.
U.S. Appl. No. 13/347,953, filed Jan. 11, 2012, Final Office Action dated May 18, 2015.
U.S. Appl. No. 13/347,953, filed Jan. 11, 2012, Response to Final Office Action dated May 18, 2015.
U.S. Appl. No. 13/347,953, filed Jan. 11, 2012, Advisory Action dated Sep. 28, 2015.
U.S. Appl. No. 13/347,953, filed Jan. 11, 2012, Non-Final Office Action dated Dec. 24, 2015.
U.S. Appl. No. 13/347,953, filed Jan. 11, 2012, Non-Compliant Amendment Office Action dated Apr. 1, 2016.
U.S. Appl. No. 13/347,953, filed Jan. 11, 2012, Response to Non-Compliant Amendment Office Action dated Apr. 1, 2016.
U.S. Appl. No. 13/347,953, filed Jan. 11, 2012, Final Office Action dated Apr. 27, 2016.
U.S. Appl. No. 13/347,953, filed Jan. 11, 2012, Non-Final Office Action dated Dec. 1, 2016.
U.S. Appl. No. 13/347,953, filed Jan. 11, 2012, Response to Non-Final Office Action dated Dec. 1, 2016.

(56) References Cited

OTHER PUBLICATIONS

U.S. Appl. No. 13/347,953, filed Jan. 11, 2012, Final Office Action dated Apr. 28, 2017.
U.S. Appl. No. 13/347,953, filed Jan. 11, 2012, Appeal Brief filed Aug. 17, 2018.
U.S. Appl. No. 13/347,953, filed Jan. 11, 2012, Appeal Brief filed Sep. 16, 2016.
U.S. Appl. No. 13/347,953, filed Jan. 11, 2012, Response to Appeal Brief filed Aug. 17, 2018.
U.S. Appl. No. 13/348,051, filed Jan. 11, 2012, Non-Final Office Action dated Aug. 26, 2013.
U.S. Appl. No. 13/348,051, filed Jan. 11, 2012, Notice of Allowance dated Apr. 25, 2014.
U.S. Appl. No. 13/348,051, filed Jan. 11, 2012, Response to Non-Final Office Action dated Aug. 26, 2013.
U.S. Appl. No. 15/390,845, filed Dec. 27, 2016, Non-Final Office Action dated Aug. 25, 2017.
U.S. Appl. No. 15/390,845, filed Dec. 27, 2016, Response to Non-Final Office Action dated Aug. 25, 2017.
U.S. Appl. No. 14/523,325, filed Oct. 24, 2014, Final Office Action dated Aug. 14, 2017.
U.S. Appl. No. 14/523,325, filed Oct. 24, 2014, Non-Final Office Action dated Feb. 9, 2017.
U.S. Appl. No. 14/523,325, filed Oct. 24, 2014, Notice of Allowance dated Sep. 19, 2017.
U.S. Appl. No. 14/523,325, filed Oct. 24, 2014, Response to Final Office Action dated Aug. 14, 2017.
U.S. Appl. No. 14/523,325, filed Oct. 24, 2014, Response to Non-Final Office Action dated Feb. 9, 2017.
U.S. Appl. No. 13/348,069, filed Jan. 11, 2012, Notice of Allowance dated Jun. 5, 2014.
U.S. Appl. No. 13/348,059, filed Jan. 11, 2012, Non-Final Office Action dated Aug. 30, 2013.
U.S. Appl. No. 13/348,059, filed Jan. 11, 2012, Response to Non-Final Office Action dated Aug. 30, 2013.
U.S. Appl. No. 13/348,059, filed Jan. 11, 2012, Final Office Action dated Feb. 7, 2014.
U.S. Appl. No. 13/348,059, filed Jan. 11, 2012, Response to Final Office Action dated Feb. 7, 2014.
U.S. Appl. No. 13/348,059, filed Jan. 11, 2012, Advisory Action dated Apr. 16, 2014.
U.S. Appl. No. 13/348,059, filed Jan. 11, 2012, Appeal Brief Filed dated Jun. 27, 2014.
U.S. Appl. No. 13/348,059, filed Jan. 11, 2012, Response to Appeal Brief Filed dated Jun. 27, 2014.
U.S. Appl. No. 13/348,059, filed Jan. 11, 2012, Patent Board of Appeals Decision dated Aug. 25, 2016.
U.S. Appl. No. 13/348,059, filed Jan. 11, 2012, Notice of Allowance dated Sep. 2, 2016.
U.S. Appl. No. 13/348,081, filed Jan. 11, 2012, Non-Final Office Action dated Jul. 3, 2013.
U.S. Appl. No. 13/348,081, filed Jan. 11, 2012, Response to Non-Final Office Action dated Jul. 3, 2013.
U.S. Appl. No. 13/348,081, filed Jan. 11, 2012, Final Office Action dated Feb. 27, 2014.
U.S. Appl. No. 13/348,081, filed Jan. 11, 2012, Response to Final Office Action dated Feb. 27, 2014.
U.S. Appl. No. 13/348,081, filed Jan. 11, 2012, Non-Final Office Action dated Oct. 29, 2015.
U.S. Appl. No. 13/348,081, filed Jan. 11, 2012, Response to Non-Final Office Action dated Oct. 29, 2015.
U.S. Appl. No. 13/348,081, filed Jan. 11, 2012, Final Office Action dated May 19, 2016.
U.S. Appl. No. 13/348,081, filed Jan. 11, 2012, Response to Final Office Action dated May 19, 2016.
U.S. Appl. No. 13/348,081, filed Jan. 11, 2012, Notice of Allowance dated Mar. 23, 2017.
U.S. Appl. No. 13/369,086, filed Feb. 8, 2012, Non-Final Office Action dated Oct. 11, 2013.
U.S. Appl. No. 13/369,086, filed Feb. 8, 2012, Response to Non-Final Office Action dated Oct. 11, 2013.
U.S. Appl. No. 13/369,086, filed Feb. 8, 2012, Final Office Action dated Jun. 23, 2014.
U.S. Appl. No. 13/369,086, filed Feb. 8, 2012, Response to Final Office Action dated Jun. 23, 2014.

* cited by examiner

LOG MONITORING SYSTEM

CROSS-REFERENCE TO RELATED APPLICATIONS

This application is a continuation of, and claims priority to, co-pending U.S. patent application titled, "Log Monitoring System," having Ser. No. 13/369,086, filed Feb. 8, 2012, which is entirely incorporated herein by reference.

BACKGROUND

Application systems executed on a server may record server logs or other important records used for diagnosing application problems. Additionally, server logs or application records may be used for security operations such as preventing customer repudiation. Server logs may be subject to corruption or tampering.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to maintaining the integrity of server logs or other application records created by a host application. A host application may create server logs or any other application record in the course of operation. A log monitoring system may periodically retrieve server logs and determine the health of the retrieved server log. In making this determination, the log monitoring system considers internal analyses that relate to the health of a retrieved log. For example, the log monitoring system analyzes whether the server log exists, whether an expected number of log files were retrieved, whether an expected server log format is used, whether an expected server log size is met, etc. Additionally, the log monitoring service analyzes external factors that may affect the health of the server log. For example, external factors may relate to the status of the host application, the existence of any intrusion into the host application, etc. By using various internal and external analyses in determining server log health, issues with server log corruption may be properly detected and addressed. In the following discussion, a general description of the system and its components is provided, followed by a discussion of the operation of the same.

Figure 1:
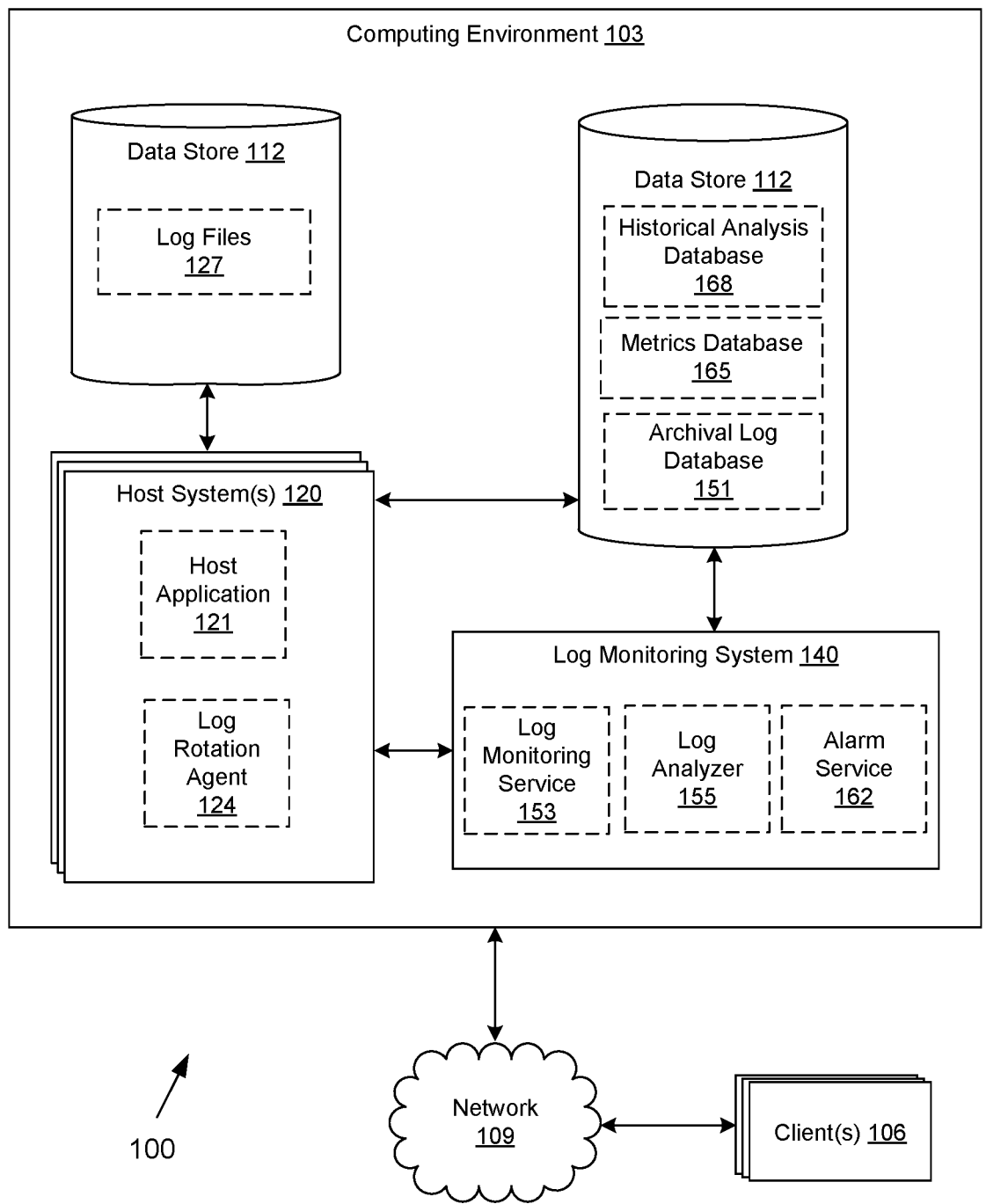
FIG. 1 is a drawing of a networked environment according to various embodiments of the present disclosure.

With reference to FIG. 1, shown is a networked environment 100 according to various embodiments. The networked environment 100 includes a network 109 in data communication with a computing environment 103 and one or more clients 106. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. The computing environment 103 may be employed, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations. A plurality of computing devices may be employed in the various arrangements of the computing environment 103 as described above.

Various applications and/or other functionality may be executed in the computing environment 103 according to various embodiments. Also, various data is stored in a data store 112 that is accessible to the computing environment 103. The data store 112 may be representative of one or a plurality of data stores as can be appreciated. The data stored in the data store 112, for example, is associated with the operation of the various applications and/or functional entities described below.

The components executed in the computing environment 103, for example, include one or more host systems 120, a log monitoring system 140, and other applications, services, processes, systems, engines, or functionality not discussed in detail herein. Alternatively, host systems 120 may be executed as one or more instances on an individual basis. Additionally, clients 106 may communicate with host systems 120 over the network 109 and use the services of a host system 120. A host application 121 may execute one or more executable processes within the host system 120. Executable processes, for example, may facilitate providing internet or web services, data base access, etc. Furthermore, Executable processes of a host application 121 may generate one or more server logs or portions of a server log. A host system 120 also includes a log rotation agent 124 that is configured to transmit server logs to an archival log database.

Additionally, a log monitoring system 140 is executed in the computing environment 103. The log monitoring system 140 is executed in the computing environment 103 to ensure that host systems 120 produce high integrity server logs. The log monitoring system 140 includes a log monitoring service 153 that is configured to generate log health signals of server logs generated by one or more host systems 120. Additionally, the log monitoring system 140 includes a log analyzer 155 that analyzes log health signals to generate a system integrity record. The log monitoring system 140 further includes an alarm service 162 that is configured to trigger an alarm when a server log may be compromised.

The data stored in the data store 112 includes, for example, log files 127, an archival log database 151, a metrics database 165, a historical analysis database 168, and potentially other data. Log files 127 may include any server logs, application records, or any other data log that is systemically generated by one or more host applications 121 executed as part of a host system 120. The archival log database 151 is configured to durably store server logs as an archive of log files 127. The metrics database 165 is configured to record system integrity records. A historical analysis database 168 stores statistical information that corresponds to a particular server log. To this end, the historical analysis database 168 stores analyses performed on log health metrics and integrity records relating to a server log to maintain a historical record of examples of server logs that have been deemed compromised.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser and/or other applications. The browser may be executed in a client 106, for example, to access and render network pages, such as web pages, or other network content served up by the computing environment 103 and/or other servers. The client 106 may be configured to execute applications beyond a browser such as, for example, email applications, instant message applications, and/or other applications. A client may use the services of a host system 120 that results in the generation of server logs.

Next, a general description of the operation of the various components of the networked environment 100 is provided. To begin, the host system 120 includes a host application 121 that provides services to other systems or users. A host application 121 may include one or more executable processes that run on the host system 120. The executable processes facilitate providing the application services of the host application. Furthermore, in the course of execution, the executable processes generate server log content expressed in one or more log files 127.

Executable processes log important information relating to the execution of the host application 121. For example, a server log may reflect a list of errors resulting from operation. Additionally, other records may be kept that assist in the diagnosis of problems encountered by the host system 120. Server logs may also be generated to assist product developers in evaluating the performance of a host system at a later point in time. Client requests made to the host system 120 may also be recorded as server log content.

A log file 127 may reflect log access attempts, application status messages, audit information, or other records regarding the operation of the host system 120. The log file 127 may be organized as multiple log files, such as a separate access log, audit log, and application log. The log files 127 may be further separated according to other system factors, for example, to provide a separate set of log files for each hour of the day or to provide a separate set of log files for each server process. Thus it may be appreciated that complex and/or comprehensive server log content may comprise hundreds or even thousands of new log files added each day.

Log files 127 are generated by host systems 120. One or more host systems 120 may be executed simultaneously across multiple computing devices in different geographic locations such that each host system 120 is generating server log content to be stored as one or more log files 127. For example, the host services provided to a client 106 may be served by multiple host systems 120 executed in parallel. Thus, log files 127 are generated in real time as host systems 120 continue with operation.

A host system 120 includes a log rotation agent 124 that is configured to scan a host system 120 for detecting log files 127. The log rotation agent 124 may transmit the detected log files 127 to an archival log database 151. In one embodiment, the log rotation agent 124 is configured to operate on a periodic basis for scanning the host system 120 for new log files 127. For example, the log rotation agent 124 may schedule a recurring Cron job, or any other job using a time-based job scheduler, to scan the contents of a log file directory every hour. The periodic process of scanning for log files 127, retrieving log files 127 and storing log files 127 in an archival log database 151 may be performed by a user-defined time interval that is pre-determined. That is to say, a user may specify the operation cycle in which the log rotation agent 124 stores detected log files 127 in an archival log database 151. In an alternate embodiment, the log rotation agent 124 randomizes the periodic basis for scanning the host system 120 for new log files to desynchronize execution of the log rotation agent 124 among the host systems 120. Ultimately, the log rotation agent 124 retrieves log files 127 and transmits the log files 127 to an archival log database 151 for storage. Thus, log files 127 are copied and stored in the archival log database 151.

As host systems 120 grow in complexity, it may become difficult to ensure that server log content is completely and correctly maintained. Lacking a strong assurance of correct operation, the integrity of the server log may, over time, be compromised by either inadvertent errors or deliberate acts. Various embodiments of the present disclosure describe a log monitoring system 140 that addresses these issues.

Figure 2:
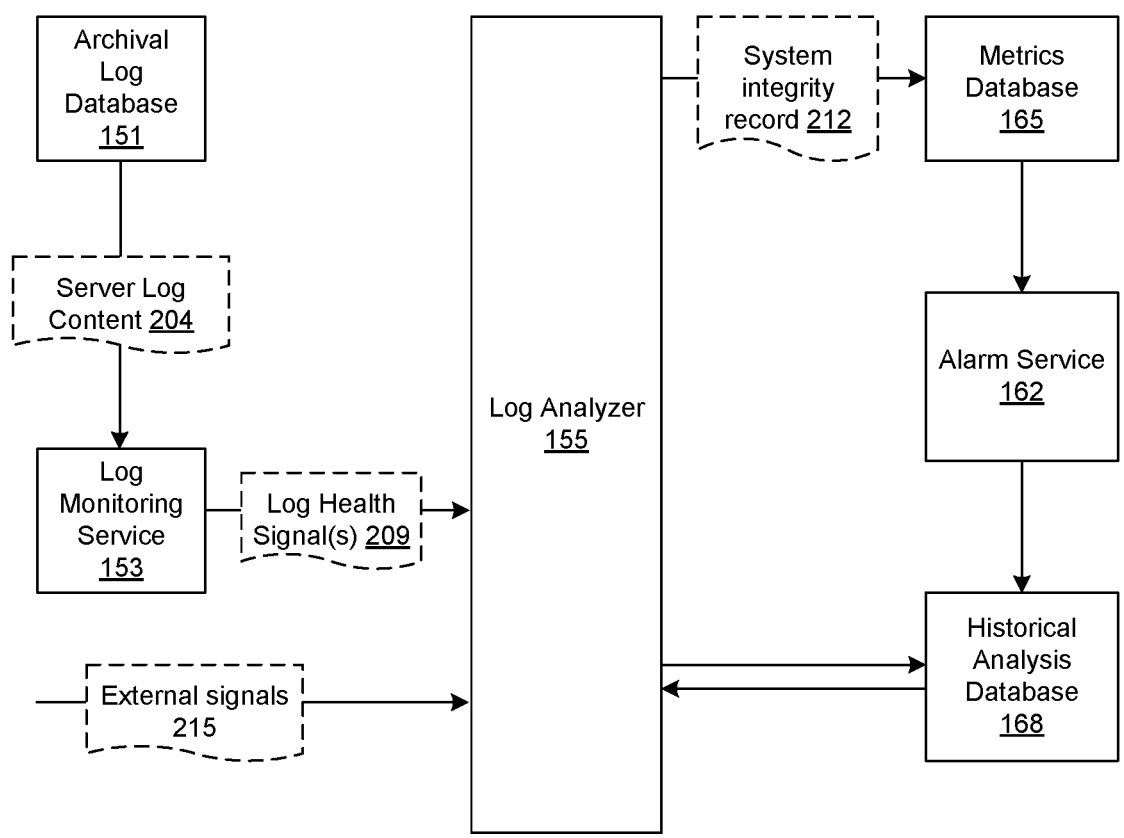
FIG. 2 is a drawing of an example of the operation of the log monitoring system executed in a computing environment in the networked environment of FIG. 1 according to various embodiments of the present disclosure.

Referring next to FIG. 2, shown is an example of the operation of the log monitoring system 140 executed in the networked environment 100 of FIG. 1 according to various embodiments of the present disclosure. Specifically, FIG. 2 depicts the handling of server log content 204. A log analyzer 155 may receive log health signals 209 that characterize the health of particular server log content 204. A log analyzer 155 may analyze the log health signals 209 as well as external signals 215 to generate a system integrity record 212.

To begin, an archival log database 151 includes server log content 204 stored as one or more log files 127 (FIG. 1) that were transmitted by a log rotation agent 124 (FIG. 1). The archival log database 151 may be organized as a file system, relational database, data warehouse, or other scheme for storing log files 127 that include server log content 204. Server log content 204 is systematically generated by host systems 120 (FIG. 1) as host systems 120 are operating. Server log content 204 may include a corresponding time stamp reflecting the time of creation. In various embodiments, components of the log monitoring system 140 process the server log content 204 within minutes, hours, or days after the generation of the server log content 204. Thus, the timing of the generation of the server log content 204 should be maintained.

In some embodiments the archival log database 151 may be partitioned into several data stores. For example, the archival log database 151 may be partitioned by application to isolate storage of the log files 127. As another example, the archival log database 151 may be partitioned by time to store a portion of the log files 127 in a cold storage area that may trade access time for cheaper operation of the storage.

A log monitoring service 153 is configured to examine the server log content 204 stored in the archival log database 151. Specifically, the log monitoring service 153 is in communication with the archival log database 151 to retrieve server log content 204. Communication with the archival log database 151 may take place using, for example, a network transport such as HTTP, HTTPS, or any message queue over a network 109 (FIG. 1). In some embodiments, communication with the archival log database 151 may be facilitated by bundling multiple log files 127 into an archive for more efficient transmission as a single communication.

Once the log monitoring service 153 obtains server log content, the log monitoring service 153 examines the server log content 204 for analysis. In this analysis process, the log monitoring service 153 analyzes the server log content 204 with respect to one or more internal characteristics of the server log content. Internal characteristics of the server log content 204 regard the intrinsic properties of one or more log files 127 that express server log content 204. For example, the internal characteristics of server log content 204 may be the size of the server log content 204, the number of log files 127 used to store the server log content 204, the data format of the server log content 204, the structure of the server log content 204, the number of errors in the server log content 204, whether the server log content 204 exists, the number of lines in a log file 127 matching a particular pattern or regular expression, the creation time of a log file 127, the last modification time of a log file 127 or any other intrinsic characteristic of the log files 127.

In one example, an internal characteristic of the server log content 204 is the size of the server log content 204. The log monitoring service 153 obtains the size of one or more log files 127 retrieved from the archival log database 151 and compares the size to an expected size. In one embodiment, the log monitoring service 153 communicates with the host systems 120 that generated the server log content 204 to obtain an expected size. For example, the log monitoring service 153 queries a configuration database, where the configuration database monitors and tracks the status of one or more host systems 120. Accordingly, the configuration database stores information about server log content that host systems 120 generate in real time. In another embodiment, the log monitoring service 153 obtains a network traffic prediction to determine an expected size of the server log content 204. In this case, an expected number of bytes generated as server log content 204 per user is multiplied by a number of users accessing the host systems 120 for a period of time. This results in an expected size of server log content 204 for a given period of time. In yet another embodiment, the expected size of a log file 127 can be determined by analyzing the actual size of recently retrieved log files 127. The expected size of a log file 127 may be a size range.

In generating a log health signal 209, the log monitoring service 153 may also apply historical analysis with respect to the size of a log file 127 to calculate whether the size is within a defined deviation from past log file sizes. As another example, the log monitoring service 153 may calculate whether the rate of change of the size of a log file 127 is within a threshold for determining spikes or dips in the log file size. Also, the log monitoring service 153 may calculate whether the size of a log file falls within expected seasonal variations, such as to account for evening, weekend, or holiday traffic. The log monitoring service 153 generates a log health signal accordingly.

In another example, the internal characteristic of the server log content 204 is a number of log files 127. Server log content 204 may be stored in any number of files in an archival log database 151. As log files 127 are generated and eventually stored in the archival log database 151, the number of log files should not change under normal operation. Again, the log monitoring service 153 may communicate with one or more host systems 120 to determine an expected number of log files that should exist.

In another example, the internal characteristic of the server log content 204 is the data format of the server log content 204. For example, a format of server log content 204 may be text based, binary, or any other format. The internal characteristics may also be the data structure of the server log. For example, server log content 204 may be expressed in a repetitive structure systematically separated by particular characters or lines. The log monitoring service 153 parses the server log content 204 to analyze the file format and/or structure. Also, another internal characteristic may be the fact of whether a log file exists.

As seen above, various internal characteristics of server log content 204 exist. Once the log monitoring service 153 retrieves one or more log files 127 for analyzing the server log content 204 contained within one or more log files 127, the log monitoring service 153 generates one or more log health signals 209 based on the analysis of the intrinsic characteristics. In one embodiment, the log monitoring service 153 generates a log health signal 209 for each internal characteristic. For example, if the log monitoring service 153 analyzes the log file size and the log format, then the log monitoring service 153 may generate a log health signal 209 representing an analysis of the log file size and a separate log health signal 209 representing an analysis of the log format. Alternatively, the log monitoring service 153 may generate one log health signal 209 that represents an analysis of a plurality of internal characteristics.

In one embodiment, the log monitoring service 153 generates a binary signal that indicates whether an issue exists with respect to a particular internal characteristic. For example, if the log monitoring service 153 determines that the size of the server log content 204 is not similar to an expected size, the log monitoring service 153 may produce a log health signal 209 indicating this result. As another example, the log monitoring service 153 checks whether a retrieved number of log files 127 matches an expected number of log files. If a discrepancy exists, then a corresponding log health signal 209 is generated. Thus, the log monitoring service 153 generates one or more log health signals 209 based on an analysis of one or more internal characteristics of a retrieved log file 127. These log health signals 209 are then transmitted to a log analyzer 155.

The log monitoring service 153 may be configured to periodically retrieve a collection of log files 127 stored in an archival log database 151. For example, the log monitoring service 153 may schedule a recurring Cron job, or any other job using a time-based job scheduler, to retrieve any log files 127 written to the archival log database 151 by the executable processes in the previous hour. In one embodiment the log monitoring service 153 is configured with a time offset to account for eventual consistency of the archival log database 151. For example, the archival log database 151 may indicate that written log files 127 will appear within 2 hours of being written. In response, the log monitoring service 154 may be configured to retrieve log files 127 written to the archival log database 151 using a time offset that exceeds 2 hours to ensure that the log files 127 will exist prior to retrieval by the log monitoring service 153. Thus, server log content 204, from the time of generation, moves along a pipeline according to a predefined cycle.

In one embodiment, while the log monitoring service 153 periodically retrieves server log content 204, additional log files 127 may be concurrently generated and subsequently transmitted to the archival log database 151. Accordingly, as the log monitoring service 153 performs a periodic retrieval, the log monitoring service 153 may be configured to retrieve all server log content 204 generated from the point in time of the last retrieval up until the current point in time or some other stopping point in time. Thus, in this embodiment, the log monitoring service 153 may be configured to retrieve the server log content 204 at varying intervals of time. Specifically, the log monitoring service 153 may use time stamp information associated with the server log content 204 to track the point in time of the last retrieval to ensure that all server log content 204 is eventually retrieved. To this end, the log monitoring service 153 decouples the retrieval of server log content 204 from any systematic storage of log files 127 in the archival log database 151.

For example, if log files 127 are stored in the archival log database 151 once every three hours, the log monitoring service 153 may retrieve server log content 204 from the archival log database 151 at points in time that are not synchronized to the periodic three hour storage. In other words, through the use of time stamps, the log monitoring service 151 decouples the way in which log files 127 are written from the way log files 127 are read.

In various embodiments, the log monitoring service 153 is configured to handle instances when the storage of log files 127 in the archival log database 151 results from an unexpected delay. This situation, which is referred to as backfilling, may be problematic when the log monitoring service 153 retrieves server log content 204 at varying intervals of time according to time stamps of previous retrievals. For example, the log monitoring service 153 performs a retrieval from the point in time of the last retrieval to the current point in time. In this example, the point in time of the last retrieval may be 9:21 PM and the current point in time may be 10:30 PM. Thus, the log monitoring service 153 retrieves all server log content 204 from the archival log database 151 with time stamps between 9:21 PM and 10:30 PM. Accordingly, the log monitoring service 153 records a point in time of last retrieval as 10:30 PM. Now assuming, in this example, that some unexpected delay in the system caused a log file 127 to be stored in the archival log database 151 with a time stamp of 9:15 PM. To counter this backfilling problem, the log monitoring service 153 may be configured to check whether log files 127 have been retrieved from the archival log database and then retrieve all unretrieved log files 127. In this example, assuming it is now 11:26 PM, the log monitoring service 153 may retrieve all log files 127 with time stamps between 10:30 PM and 11:26 PM as well as any log files 127 that have not been retrieved prior to 10:30 PM. Furthermore, the log monitoring service 153 may be configured to generate recalculated log health signals 209 based on analyzing any server log content 204 that was unexpectedly delayed.

Next, a log analyzer 155 may analyze received log health signals 209 to determine whether to transmit a system integrity record 212 to a metrics database 165. In one embodiment, the log analyzer 155 executes an algorithmic process mapping a vector of received log health signals 209 to a Boolean determination of whether to transmit a system integrity record 212. That is to say, the log analyzer 155 analyzes one or more received log health signals 209 to determine whether to generate a system integrity record 212. For example, abstaining from generating a system integrity record 212 indicates an integrity issue or error with the currently retrieved server log content 204. To this end, the system integrity record 212 indicates whether a server log content error exists based on an analysis of the log health signals 209 and/or external signals 215. Thus, in this example, the system integrity record 212 is a heartbeat signal that is periodically generated for each periodic retrieval of server log content 204. Furthermore, the heartbeat signal is a binary signal that indicates either an absence or presence of a log integrity issue or error relating to currently retrieved server log content 204. In alternate embodiments, the system integrity record 212 is a signal that includes various factors that characterize the health of particular server log content 204. For example, rather than being a binary signal, the system integrity record 212 encodes the log health signals 209 along with any corresponding external signals.

In one example, the log analyzer 155 receives log health signals 209 that indicate issues with a number of internal characteristics of server log content 204 retrieved for a particular point in time. The log health signals 209 may indicate that the particular server log content 204 has an expected file size, file format, file structure, and expected number of files. Accordingly, the log analyzer 155 may generate a system integrity record 212 indicating that the particular server log content 204 does not have log integrity issues or errors.

In a similar example, the log health signals 209 may indicate that the currently retrieved server log content 204 has an expected number of files, expected file format, and an expected file structure. However, the log health signal 209 indicates that the currently retrieved server log content 204 does not have an expected file size. In this case, the log analyzer 155 may still generate a system integrity record 212 indicating that the currently retrieved server log content 204 has no log integrity issues or errors because only a minority of log health signals 209 indicates a potential issue. The majority of log health signals 209, on the other hand, indicate that the server log content 204 meets expectations. That is to say, a mismatch of expected file size and actual file alone may not warrant a log error.

In one embodiment, the log analyzer 155 weights each received log health signal 209 when determining whether to generate a system integrity record 212. For example, the log analyzer 155 may be configured to deem issues with file structure as important. When a log monitoring service 153 determines that the file structure of a retrieved log does not meet an expected file structure, a corresponding log health signal 209 is generated. This corresponding log health signal may be given extra weight by a log analyzer 155 when determining whether to generate a system integrity record 212. So, even if the log health signals 209 indicate that all other internal characteristics of server log content 204 meet expectations, the log analyzer 155 may abstain from generating a system integrity record 212.

In alternate embodiments, the presence of a system integrity record 212 indicates an integrity issue with a currently retrieved log while the absence of a system integrity record 212 indicates no integrity issue.

In generating the system integrity record 212, the log analyzer 155 may also apply historical analysis to a log health signal 209 for the size of a log file 127 to calculate whether the size is within a defined deviation from past log file sizes. As another example, the log analyzer 155 may calculate whether the rate of change of the size of a log file 127 is within a threshold for determining spikes or dips in the log file size. Also, the log analyzer 155 may calculate whether the size of a log file falls within expected seasonal variations, such as to account for evening, weekend, or holiday traffic.

In addition to analyzing log health signals 209 to determine whether to transmit a system integrity record 212, the log analyzer 155 may also analyze external signals 215. An external signal 215, for example, may be any signal that indicates the health of the host system 120. Moreover, external signals 215 may represent any issues relating to the computing environment 103 (FIG. 1). While internal characteristics address the inherent nature of server log content 204, external signals 215 reflect the environment in which the server log content 204 was generated. Problems in the host system 120 may result in generating corrupt server log content 204. Additionally, external signals 215 may be received from an infrastructure database that determines an expected number of host systems 120 that should be transmitting log files 127. In various embodiments, an external signal 215 may be any input received from a historical analysis database 168, which is discussed in greater detail below.

In one example, an external signal 215 may relate to whether intrusion is detected on the host system 120. For example, intrusion detection and prevention systems may be executed concurrently along with host applications 121 (FIG. 1). When an actual or potential intrusion is identified, an external signal may be sent to the log analyzer 155 in response. Then, the log analyzer 155 considers the fact of potential or actual intrusion when determining whether to generate a system integrity record 212.

In another example, external signals 215 may be generated by the host system 120 when the host system 120 encounters operational errors. Alternatively, any other system that monitors the operational status of the host system 120 may generate external signals 215 to inform the log analyzer 155.

Accordingly, the log analyzer 155 applies the information contained within an external signal 215 for making a determination of whether to transmit a system integrity record 212. In doing so, the log analyzer 155 is configured to account for the timing between the origination of the external signal 215 and the generation of the server log content 204. The log analyzer 155 analyzes log health signals 209 relating to a server log content 204 that is not necessarily recent, as the log rotation agent 124 may be programmed to delay the transmission of log files 127 to the archival log database 151. On the other hand, the event that triggered the external signal (e.g., intrusion detection, host system errors, other computing environment errors, etc.) includes a time stamp reflecting the time of the event, which may be real time. Thus, the log analyzer 155 is configured to match the time stamp of the server log content 204 and any corresponding log health signals 209 to the time stamp of any external signals. Furthermore, the log analyzer 155 may be configured to recalculate a system integrity record 212 when a delayed log file 127 is retrieved as a result of the backfilling problem. In this case, the log analyzer 155 uses the time stamp of the log file 127 with the delayed retrieval to generate the system integrity record.

The log analyzer 155 may transmit the system integrity record 212 to a metrics database 165 that stores system integrity records 212. For example, system integrity records 212 may be stored sequentially in chronological order.

In various embodiments, an alarm service 162 is configured to examine the metrics database 165 for analyzing the history of system integrity records 212. If system integrity records 212 are configured to be a binary result, the alarm service 162 checks to see whether there is an absence of a system integrity record 212, where an absence or a presence indicates an integrity issue or error with particular server log content 204.

In various embodiments, an alarm service 162 examines the metrics database 165 for system integrity records 212 and, based on the absence of a system integrity record 212, the alarm service may fire an alarm. The alarm service may fire an alarm by, for example, transmitting a notification message to a consumer subscribed to a message queue or notification service.

In one embodiment the alarm service 162 looks for multiple missed integrity records before firing an alarm. For example, the alarm service 162 may check whether a threshold number of consecutive system integrity records 212 are absent. If the threshold number is 2, then 3 or more consecutive system integrity records 212 that are absent may cause the triggering of an alarm. In another example, the alarm service 162 checks whether a percent of absent integrity records exceeds a threshold percent. So, for example, if the last 3 of 5 integrity records are absent, then an alarm may be triggered. Requiring multiple confirmation of an integrity issue may provide operational benefit such as reducing the occurrence of false alarms.

In various embodiments, the log monitoring system 140 includes a historical analysis database 168 that stores instances of alarm decisions. The alarm service 162 may publish a record of an alarm decision to the historical analysis database 168. The historical analysis database 168 may contain records correlating a past instance of received log health signals 209 to a past decision of whether to transmit a system integrity record 212 was correct. For example, the historical analysis database 168 may record a past instance of received log health signals 209 that led to an alarm being fired along with a determination of whether the fired alarm was a false alarm or a true alarm.

Accordingly, the historical analysis database 168 may, for example, be used as a feedback process to tune the analysis of the log health signals 209 by the log analyzer 155 based on past alarm outcomes. The log analyzer 155 may base the determination of whether to transmit a system integrity record 212, at least in part, on a contained record in the historical analysis database 168. In one embodiment, the log analyzer 155 uses a naïve Bayes classifier to assist the log analyzer 155 in determining whether to transmit a system integrity record 212. The log analyzer 155 uses the contained record to calculate a probability model for the naïve Bayes classifier. Thus, the log analyzer 155 may consult a historical analysis database 168 to calculate statistical information based on received log health signals 209.

Figure 3:
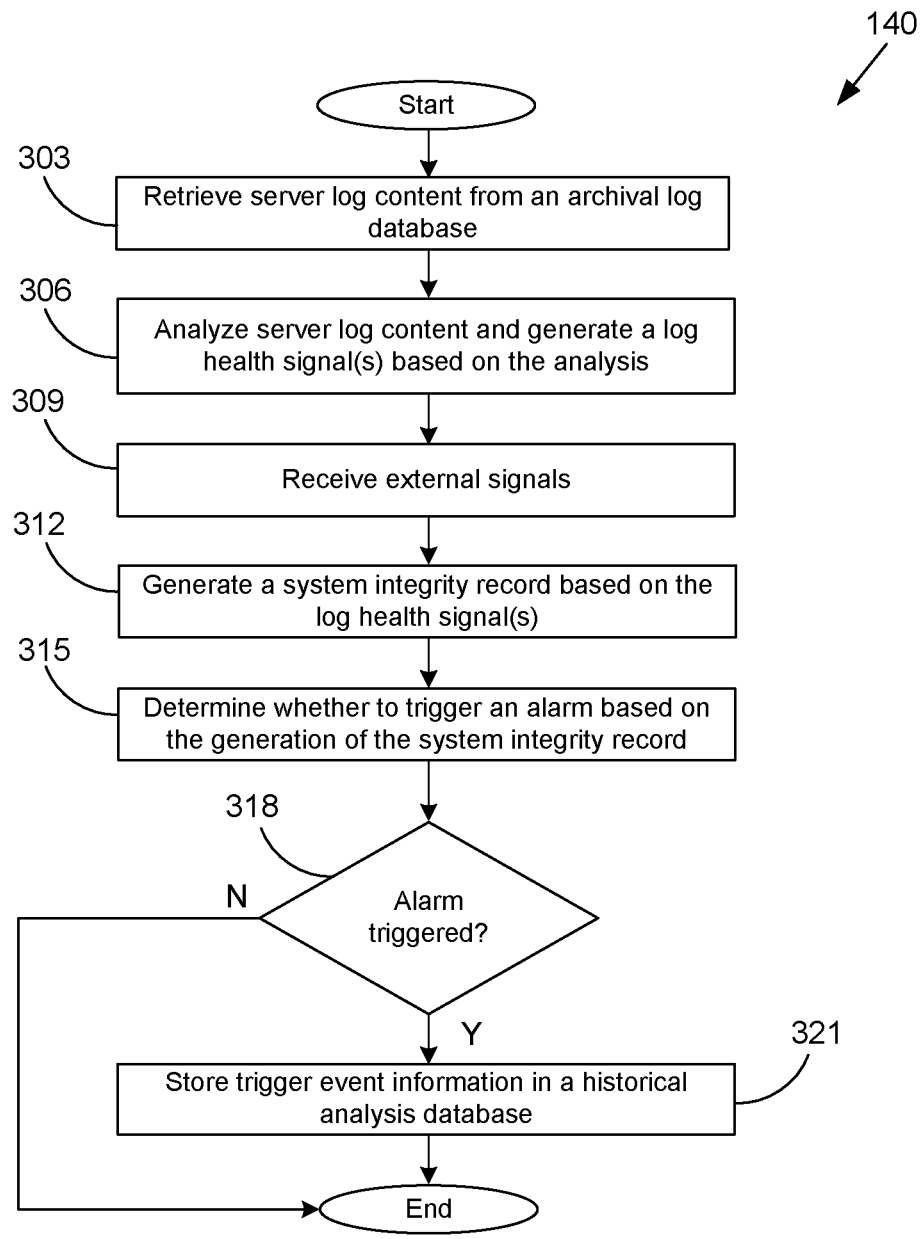
FIG. 3 is a flowchart illustrating one example of functionality implemented as portions of the log monitoring system executed in a computing environment in the networked environment of FIG. 1 according to various embodiments of the present disclosure.

Referring next to FIG. 3, shown is a flowchart that provides one example of the operation of a portion of the log monitoring system 140 according to various embodiments. It is understood that the flowchart of FIG. 3 provides merely an example of the many different types of functional arrangements that may be employed to implement the operation of the portion of the log monitoring system 140 as described herein. As an alternative, the flowchart of FIG. 3 may be viewed as depicting an example of steps of a method implemented in the computing environment 103 (FIG. 1) according to one or more embodiments.

Beginning with box 303, the log monitoring system 140 retrieves server log content from an archival log database 151 (FIG. 1). For example, the log monitoring system 140 may be programmed to periodically retrieve server log content 204 (FIG. 2) according to a predetermined retrieval cycle, such as, for example, once an hour.

In box 306, the log monitoring system 140 analyzes the server log content 204 and generates one or more log health signals 209 (FIG. 2) based on the analysis. In one example, each log health signal 209 corresponds to an analysis of a respective internal characteristic of the server log content 204. Accordingly, there may be log health signals 209 that correspond to a log file size analysis, a log format analysis, a log structure analysis, etc.

In box 309, the log monitoring system 140 receives external signals that reflect the status, health, or history of the host systems 120 (FIG. 1) or computing environment 103. In one embodiment, the log analyzer 155 receives the external signals 215 (FIG. 2) and analyzes them with respect to any server log content 204 that was generated at the time the external signal 215 was generated.

In box 312, the log monitoring system 140 generates a system integrity record 212 (FIG. 2) based on the one or more log health signals 209. Additionally, the log monitoring system 140 may base its determination on any received external signals 215. The system integrity records may reflect a complete analysis of the log health signals 209 and any corresponding external signals 215. In various embodiments, the generation of a system integrity record 212 is a binary result where the absence of generating a system integrity record 212 symbolizes a determination of a log integrity issue or error for particular server log content.

In box 315, the log monitoring system 140 determines whether to trigger an alarm based on the generation of the system integrity record 212. Depending on the number of absent or present system integrity records, an alarm may be triggered. For example, three consecutive absent system integrity records 212 may result in the triggering of an alarm.

In box 318, if an alarm is not triggered, then the operation of the portion of the log monitoring system 140 described above ends. However, if the alarm is triggered, then, in box 321, the log monitoring system 140 stores trigger event information in a historical analysis database 168 (FIG. 1). Thus, the historical analysis database 168 may include a list of contained records where alarms were triggered along with a corresponding analysis that led to the determination of triggering the alarm. The log monitoring system 140 may use this historical analysis database 168 to make subsequent analyses regarding retrieved server log content 204.

Figure 4:
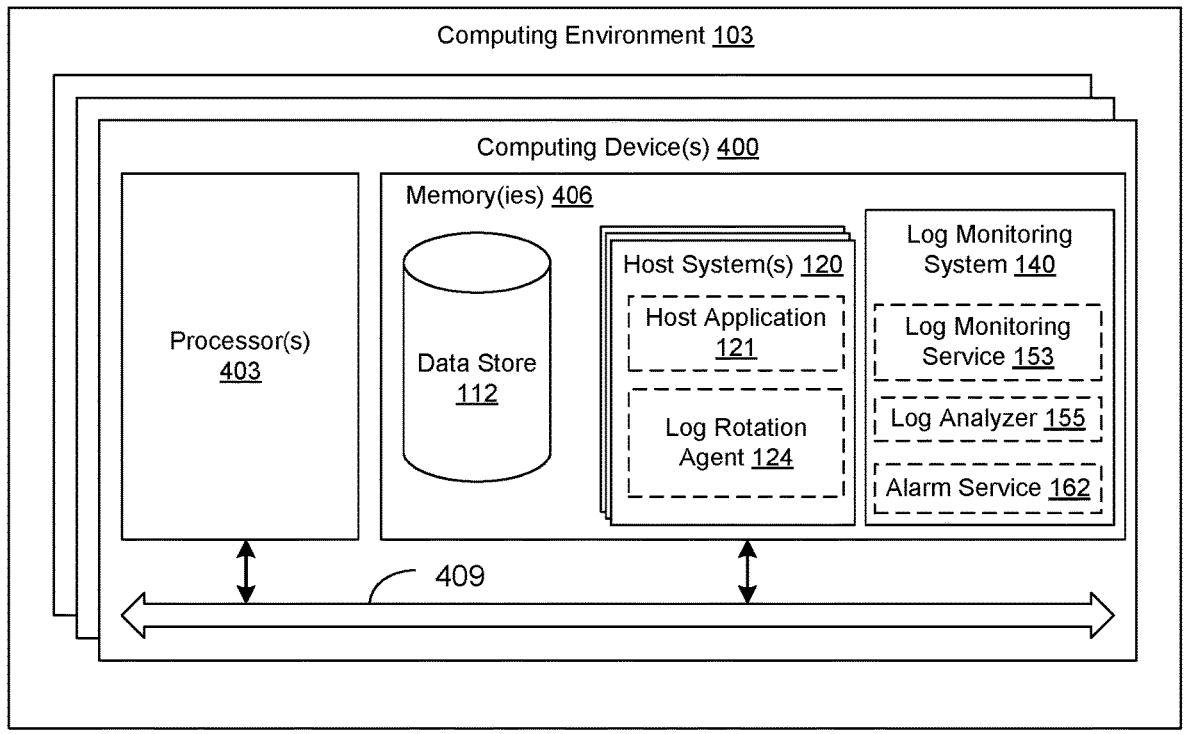
FIG. 4 is a schematic block diagram that provides one example illustration of a computing environment employed in the networked environment of FIG. 1 according to various embodiments of the present disclosure.

With reference to FIG. 4, shown is a schematic block diagram of a computing device 400 which may be employed in the computing environment 103 according to an embodiment of the present disclosure. The computing device 400 may also correspond, for example, to a client 106 (FIG. 1). The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are host systems 120, log monitoring systems 140, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although host systems 120, the log monitoring system 140, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the log monitoring system 140. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including host systems 120, the log monitoring system 140, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions executable by at least one computing device, wherein, upon execution, the plurality of computer instructions cause the at least one computing device to:
retrieve a plurality of log files generated by at least one host application;
generate a first log health signal based at least in part on whether a data size of the plurality of log files is within a defined deviation of an expected server log data size for a time period, wherein the expected server log data size is determined at least in part as a function of a network traffic prediction, the network traffic prediction being determined based at least in part on both an expected quantity of log file data generated per client multiplied by a quantity of a plurality of clients accessing a host system within the time period, the at least one host application being executed by the host system;
generate a second log health signal based at least in part on whether the plurality of log files meets an expected number of log files;
generate a third log health signal based at least in part on whether the plurality of log files meets an expected server log format, wherein the expected server log format comprises a defined file format;
receive an indication of an operational error detected by the host system and a time of origination of the operational error;
determine at least one log file of the plurality of log files associated with the operational error by matching the time of origination of the operational error to a time of creation of the at least one log file; and
determine a server log content error record based at least in part on the first log health signal, the second log health signal, the third log health signal, the at least one log file, and the operational error, the server log content error record including a server log content error associated with an interval of time, and the server log error record represents an absence or a detection of log tampering or log file corruption.

2. The non-transitory computer-readable medium of claim 1, wherein individual ones of the plurality of log files comprise a record of a plurality of operations executed in association with the at least one host application.

3. The non-transitory computer-readable medium of claim 1, wherein the plurality of computer instructions further cause the at least one computing device to transmit the server log content error to an alarm service for transmitting a notification message to a client device according to the server log content error.

4. A system, comprising:
at least one computing device; and
at least one application stored on a hardware memory executed by a hardware processor in the at least one computing device, the at least one application causing the at least one computing device to at least:
  receive a plurality of log files generated by a host application;
  generate a first log health signal based at least in part on whether a data size of the plurality of log files is within a defined deviation of an expected server log content data size for a time period, wherein the expected server log content data size is determined at least in part as a function of a network traffic prediction, the network traffic prediction being determined at least in part as a function of both an expected quantity of log file data generated per client multiplied by a quantity of a plurality of clients accessing a host system within the time period, the host application being executed by the host system;
  generate a second log health signal based at least in part on whether the plurality of log files meets an expected number of log files;
  generate a third log health signal based at least in part on whether the plurality of log files meets an expected server log format, wherein the expected server log format comprises a defined file format;
  receive an indication of an operational error detected by the host system and a time of origination of the operational error;
  determine that at least one log file of the plurality of log files is associated with the operational error by matching the time of origination of the operational error to a time of creation of the at least one log file; and
  determine a server log content error record based at least in part on the first log health signal, the second log health signal, the third log health signal, the at least one log file, and the operational error, the server log content error record including a log content error associated with an interval of time, and the server log content error record represents an absence or a detection of log tampering or log file corruption.

5. The system of claim 4, wherein the at least one application further causes the at least one computing device to at least generate an alarm in response to generating a plurality of consecutive system integrity errors.

6. The system of claim 4, wherein the third log health signal is generated in response to identifying a threshold number of errors in the plurality of log files.

7. The system of claim 4, wherein the third log health signal is generated in response to a threshold number of lines in at least one log file matching a particular pattern.

8. The system of claim 4, wherein the expected server log content data size is further determined from receiving an expected data size for the host application from a configuration database.

9. The system of claim 4, wherein the plurality of log files are retrieved from an archival log database based at least in part on a time offset from a generation of at least one of the plurality of log files.

10. The system of claim 4, wherein the server log content error is generated based at least in part on a weight associated with at least one log health signal.

11. The system of claim 4, wherein the at least one application further causes the at least one computing device to at least receive an intrusion detection signal transmitted from an intrusion detection system that executes concurrently with the host application, wherein the intrusion detection signal is transmitted in response to detecting an intrusion event for the host application.

12. The system of claim 4, wherein the at least one application further causes the at least one computing device to identify a previous alarm decision, from memory, by correlating at least one log health signal to a previous log health signal associated with the previous alarm decision, wherein the previous alarm decision comprises an indication of whether a respective system log error was generated in response to the previous log health signal.

13. The system of claim 12, wherein generating the server log content error is further based at least in part on the previous alarm decision.

14. The system of claim 4, wherein the at least one application further causes the at least one computing device to store, in a memory accessible to the at least one computing device, a historical analysis comprising the server log content error and a corresponding analysis of a determination for transmitting an alarm for the server log content error, wherein the corresponding analysis comprises an indication as to whether the alarm was a false alarm or a true alarm.

15. The system of claim 4, wherein the at least one application further causes the at least one computing device to transmit the server log content error to an alarm service for generating an alarm according to the server log content error.

16. The system of claim 4, wherein the at least one application further causes the at least one computing device to transmit an alarm notification to a client device in response to determining that a percent of a plurality of server log errors among a plurality of time intervals exceeds a threshold percentage.

17. A method, comprising:
  receiving, in at least one computing device, a plurality of log files generated by a host application;
  generating, in the at least one computing device, a first log health signal based at least in part on whether a data size of the plurality of log files is within a defined deviation of an expected server log data size for a time period, wherein the expected server log data size is determined at least in part as a function of a network traffic prediction, the network traffic prediction being determined based at least in part on both an expected quantity of data generated per client multiplied by a quantity of a plurality of clients accessing a host system within the time period, the host application being executed by the host system;
  generating, in the at least one computing device, a second log health signal based at least in part on whether the plurality of log files meets an expected number of log files;
  generating, in the at least one computing device, a third log health signal based at least in part on whether the plurality of log files meets an expected server log format, wherein the expected server log format comprises a defined file format;
  receiving, in the at least one computing device, an indication of an operational error detected by the host system and a time of origination of the operational error;
  determining, in the at least one computing device, at least one log file of the plurality of log files as being associated with the operational error by matching the time of origination of the operational error to a time of creation of the at least one log file of the plurality of log files; and
  determining, in the at least one computing device, a system log error record based at least in part on the first log health signal, the second log health signal, the third log health signal, the at least one log file, and the operational error, the system log error record including a server log content error associated with an interval of time, wherein the system log error record represents an absence or a detection of log tampering or log file corruption.

18. The method of claim 17, further comprising storing, in a memory accessible to the at least one computing device, a historical analysis comprising the system log error record, a corresponding analysis of a determination of the system log error record, and a plurality of past alarm outcomes associated with at least one log health signal.

19. The method of claim 18, further comprising, in the at least one computing device, tuning an analysis used to generate the system log error record based at least in part on the historical analysis.

20. The method of claim 17, wherein generating the system log error record further comprises recalculating the system log error record based at least in part on a delayed log file retrieved in response to a log backfilling occurrence.

\* \* \* \* \*